(12) United States Patent
Grokop et al.

(10) Patent No.: US 10,924,565 B2
(45) Date of Patent: Feb. 16, 2021

(54) TRACKING EVENT ATTENDANCE

(71) Applicant: Facebook, Inc., Menlo Park, CA (US)

(72) Inventors: Leonard Henry Grokop, San Mateo, CA (US); Lei Wang, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 183 days.

(21) Appl. No.: 15/829,713

(22) Filed: Dec. 1, 2017

(65) Prior Publication Data
US 2019/0173966 A1  Jun. 6, 2019

(51) Int. Cl.
| H04L 29/08 | (2006.01) |
|---|---|
| G06Q 50/00 | (2012.01) |
| G06N 20/00 | (2019.01) |
| G06F 16/29 | (2019.01) |
| G06F 3/0483 | (2013.01) |

(52) U.S. Cl.
CPC .............. *H04L 67/22* (2013.01); *G06F 16/29* (2019.01); *G06N 20/00* (2019.01); *G06Q 50/01* (2013.01); *H04L 67/18* (2013.01); *H04L 67/36* (2013.01); *G06F 3/0483* (2013.01); *H04L 67/306* (2013.01)

(58) Field of Classification Search
CPC ........ G06N 20/00; H04L 67/22; H04L 67/18; H04L 67/36; H04L 67/306; G06F 16/29; G06F 3/0483; G06Q 50/01
See application file for complete search history.

(56) References Cited

U.S. PATENT DOCUMENTS

| 8,700,540 | B1 * | 4/2014 | Zambrano | ......... G06F 16/24578 |
|---|---|---|---|---|
| | | | | 705/319 |
| 2008/0120396 | A1 * | 5/2008 | Jayaram | .................. G06Q 10/10 |
| | | | | 709/218 |
| 2008/0215426 | A1 * | 9/2008 | Guldimann | ............ G06Q 30/02 |
| | | | | 705/14.61 |
| 2010/0257014 | A1 * | 10/2010 | Roberts | ................. G06F 3/0488 |
| | | | | 705/7.19 |
| 2011/0246383 | A1 * | 10/2011 | Gibson | .................. G06Q 50/01 |
| | | | | 705/319 |
| 2013/0080922 | A1 * | 3/2013 | Elias | .................... G06Q 10/1095 |
| | | | | 715/753 |
| 2016/0092040 | A1 * | 3/2016 | Sherman | ................. H04L 51/32 |
| | | | | 715/752 |
| 2016/0131490 | A1 * | 5/2016 | Kimes | .................. G01C 21/343 |
| | | | | 701/440 |

(Continued)

*Primary Examiner* — Oanh Duong
(74) *Attorney, Agent, or Firm* — Baker Botts L.L.P.

(57) ABSTRACT

In one embodiment, a method includes receiving one or more input signals comprising one or more event signals associated with an event and one or more user signals associated with a user, where the input signals include time-based signals, each of which includes an event time or a user arrival time, and the input signals further include location-based signals, each of which includes an event location or a user location. The method may further include determining, using a trained machine-learning model, whether the user attended the event according to the input signals, and presenting, to a target user, an indication of whether the user attended the event. The machine-learning model may be trained on list of tuples, each of which includes a user identifier, an event identifier, and an indication of whether the user identified by the user identifier attended the event identified by the event identifier.

18 Claims, 8 Drawing Sheets

(56) References Cited

U.S. PATENT DOCUMENTS

| | | | |
|---|---|---|---|
| 2017/0094459 A1* | 3/2017 | Leclerc | H04L 67/10 |
| 2017/0262511 A1* | 9/2017 | Calzada Gomez | G06F 16/2477 |
| 2017/0308866 A1* | 10/2017 | Dotan-Cohen | H04L 43/0876 |
| 2018/0060439 A1* | 3/2018 | Kula | G06Q 30/06 |
| 2018/0176383 A1* | 6/2018 | Kumar | H04W 4/029 |
| 2018/0197153 A1* | 7/2018 | Busch | G06Q 10/1095 |
| 2019/0026758 A1* | 1/2019 | Ram Bhuyan | G06N 20/00 |
| 2019/0050945 A1* | 2/2019 | Ash | G06Q 50/01 |

* cited by examiner

500

| | Adam | Betsy | Charlie | Diane |
|---|---|---|---|---|
| Cadet Concert | Distance: + <br> Time: + <br> RSVP: ++ <br> Friends RSVP: + <br> Viewed: ++ <br> Total views: + <br> Type: + <br> Likes: + <br> Total: 10/16 | Distance: ++ <br> Time: + <br> RSVP: ++ <br> Friends RSVP: + <br> Viewed: ++ <br> Total views: + <br> Type: 0 <br> Likes: + <br> Total: 10/16 | Distance: + <br> Time: + <br> RSVP: 0 <br> Friends RSVP: + <br> Viewed: ++ <br> Total views: + <br> Type: 0 <br> Likes: + <br> Total: 7/16 | Distance: 0 <br> Time: + <br> RSVP: 0 <br> Friends RSVP: 0 <br> Viewed: 0 <br> Total views: + <br> Type: + <br> Likes: + <br> Total: 4/16 |
| Lunch (8 Oct) | Distance: ++ <br> Time: ++ <br> RSVP: + <br> Friends RSVP: + <br> Viewed: ++ <br> Total views: 0 <br> Type: + <br> Likes: 0 <br> Total: 10/16 | Distance: + <br> Time: ++ <br> RSVP: 0 <br> Friends RSVP: + <br> Viewed: 0 <br> Total views: 0 <br> Type: + <br> Likes: 0 <br> Total: 5/16 | Distance: + <br> Time: ++ <br> RSVP: ++ <br> Friends RSVP: + <br> Viewed: 0 <br> Total views: 0 <br> Type: + <br> Likes: 0 <br> Total: 7/16 | Distance: + <br> Time: ++ <br> RSVP: 0 <br> Friends RSVP: + <br> Viewed: 0 <br> Total views: 0 <br> Type: + <br> Likes: 0 <br> Total: 5/16 |
| DJ Shadow | Distance: + <br> Time: + <br> RSVP: 0 <br> Friends RSVP: + <br> Viewed: 0 <br> Total views: + <br> Type: + <br> Likes: 0 <br> Total: 5/16 | Distance: + <br> Time: + <br> RSVP: ++ <br> Friends RSVP: + <br> Viewed: ++ <br> Total views: + <br> Type: + <br> Likes: 0 <br> Total: 9/16 | Distance: ++ <br> Time: + <br> RSVP: ++ <br> Friends RSVP: + <br> Viewed: ++ <br> Total views: + <br> Type: 0 <br> Likes: 0 <br> Total: 9/16 | Distance: + <br> Time: + <br> RSVP: ++ <br> Friends RSVP: + <br> Viewed: ++ <br> Total views: + <br> Type: + <br> Likes: 0 <br> Total: 9/16 |

| | Adam | Betsy | Charlie | Diane |
|---|---|---|---|---|
| Oktoberfest | Distance: ÷<br>Time: ↔<br>RSVP: ↔<br>Friends RSVP: ÷<br>Viewed: ↔<br>Total views: ÷<br>Type: ÷<br>Likes: ↔<br>Total: 12/16 | Distance: 0<br>Time: ↔<br>RSVP: ↔<br>Friends RSVP: ÷<br>Viewed: ↔<br>Total views: ÷<br>Type: ÷<br>Likes: ↔<br>Total: 11/16 | Distance: ÷<br>Time: ↔<br>RSVP: 0<br>Friends RSVP: ÷<br>Viewed: ↔<br>Total views: ÷<br>Type: ÷<br>Likes: ↔<br>Total: 10/16 | Distance: ↔<br>Time: ↔<br>RSVP: ↔<br>Friends RSVP: ÷<br>Viewed: ↔<br>Total views: ÷<br>Type: ÷<br>Likes: ↔<br>Total: 13/16 |
| Lunch (10 Oct) | Distance: ÷<br>Time: 0<br>RSVP: ↔<br>Friends RSVP: ÷<br>Viewed: ↔<br>Total views: 0<br>Type: ÷<br>Likes: 0<br>Total: 6/16 | Distance: 0<br>Time: 0<br>RSVP: 0<br>Friends RSVP: ÷<br>Viewed: ↔<br>Total views: 0<br>Type: ÷<br>Likes: 0<br>Total: 3/16 | Distance: 0<br>Time: 0<br>RSVP: 0<br>Friends RSVP: ÷<br>Viewed: 0<br>Total views: 0<br>Type: ÷<br>Likes: 0<br>Total: 1/16 | Distance: 0<br>Time: 0<br>RSVP: ↔<br>Friends RSVP: ÷<br>Viewed: ↔<br>Total views: 0<br>Type: ÷<br>Likes: 0<br>Total: 5/16 |

*FIG. 5B*

TRACKING EVENT ATTENDANCE

TECHNICAL FIELD

This disclosure generally relates to processing events on online social networks.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, an event-processing system, which may be implemented in a social-networking system, may determine whether particular users of the social-networking system have attended or will attend particular real-world events according to one or more input signals, which may be based on event and user data. This determination may be performed by a machine-learning model, which may generate an event attendance result indicating whether a particular user attended a particular event. The determination may be made based on input signals that may change frequently, such as the user's location, the current time, and so on. If the event occurred in the past, then a determination may be made as to whether the user attended the event based on historical values of the input signals. If the event occurs in the future, then a prediction may be made as to whether the user will attend the future event. The prediction may be made based on input signals that change infrequently and are therefore likely to be valid in the future, such as the type of event a user prefers, the friends of the user, the user's home location, and the like.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 5A and 5B illustrate example signals.

DESCRIPTION OF EXAMPLE EMBODIMENTS

Figure 1:
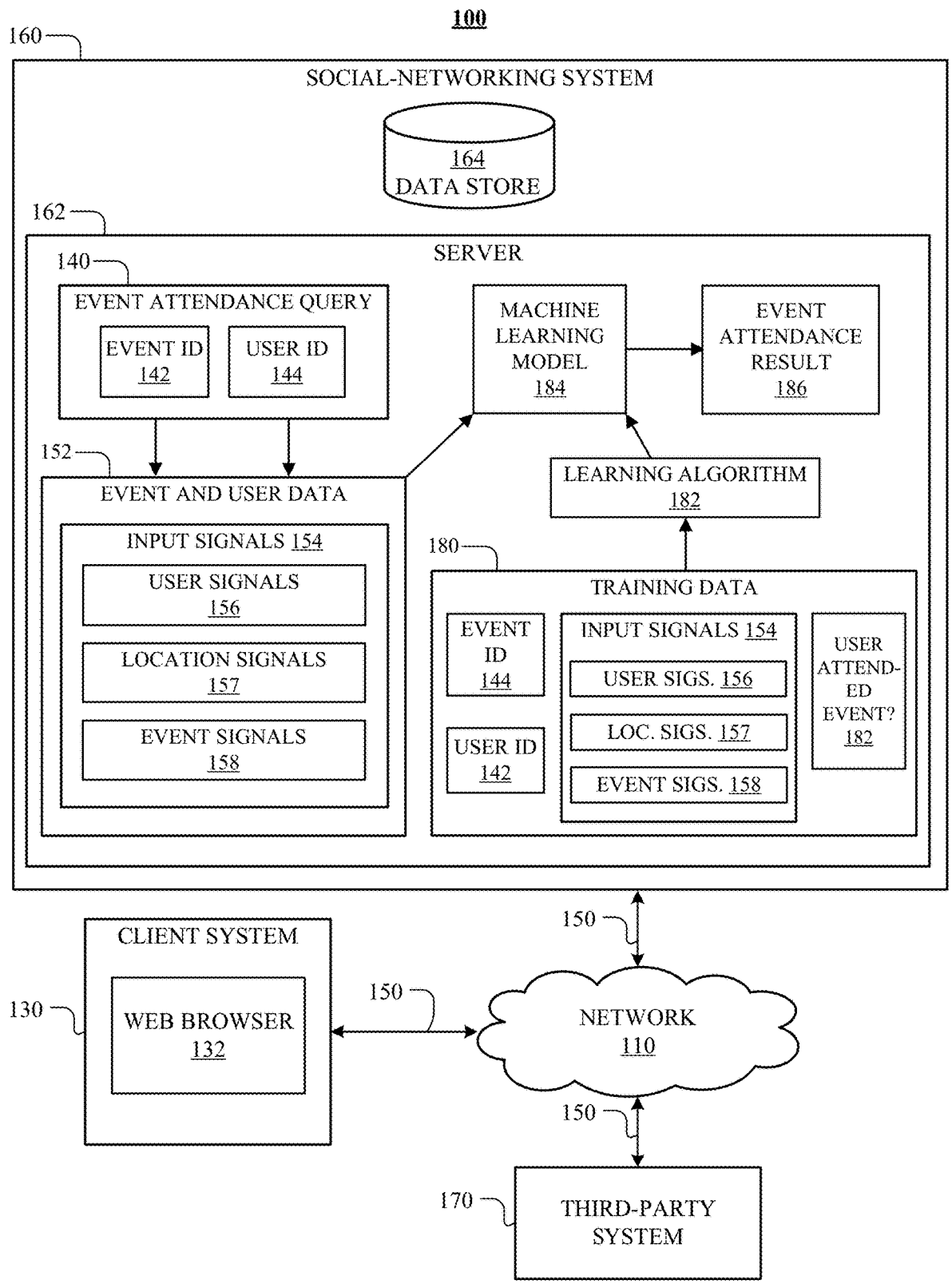
FIG. 1 illustrates an example network environment associated with a social-networking system including features for determining whether users have attended or will attend events according to signals associated with the users and events.

FIG. 1 illustrates an example network environment 100 associated with a social-networking system including features for determining whether users have attended or will attend events according to signals associated with the users and events. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

In particular embodiments, an event-processing system, which may be implemented in a social-networking system, may determine whether particular users of the social-networking system have attended or will attend particular real-world events according to one or more input signals, which may be based on event and user data. This determination may be performed by a machine-learning model 184, which may generate an event attendance result indicating whether a particular user attended a particular event. The determination may be made based on input signals that may change frequently, such as the user's location, the current time, and so on. If the event occurred in the past, then a determination may be made as to whether the user attended the event based on historical values of the input signals. If the event occurs in the future, then a prediction may be made as to whether the user will attend the future event. The prediction may be made based on input signals that change infrequently and are therefore likely to be valid in the future, such as the type of event a user prefers, the friends of the user, the user's home location, and the like.

In particular embodiments, the machine-learning model 184 may generate an event attendance result 186 indicating whether a particular user represented by a user ID 144 attended a particular event represented by an event ID 142. The event ID 142 may be, e.g., a name or number that identifies the event. The user ID 144 may similarly be a name or number that identifies the event. The determination may be performed in response to receiving an event attendance query 140. The event and user data 152 may be data associated with the event and user specified in the query 140. The attendance result 186 may be, e.g., a Boolean value such as true or false, or the like. The event attendance result 186 may be associated with a confidence value, which may represent a confidence that the attendance result 186 is accurate. The confidence value may be, e.g., a probability value between 0 and 1, a percentage value between 0 and 100%, or other appropriate quantity representing a level of confidence.

The user ID 144 and event ID 142 may be received in an event attendance query 140, which may be a request to determine whether a particular user identified by the user ID 144 has attended an event identified by the event ID 142, or is attending or will attend, depending on the start and end times of the event. The event that corresponds to the event ID 142 may be a past event that has start and end times in the past, a current event that has a start time in the past and an end time in the future, or a future event that has start and end times in the future. An event attendance result 186 for a past event may thus indicate whether the user identified by the user ID 144 attended the event represented by the event ID 142. An event attendance result 186 for a current event may indicate whether the user is attending the current event, and an event attendance result 186 for a future event may indicate whether the user will attend the future event. The event attendance result 186 may be generated by the machine-learning model 184 based on one or more input signals 154 that are included in the event and user data 152. The input signals 154 may be based on attributes of the event and the user, such as location, time, event engagement, friend engagement, and the like, as described below.

In particular embodiments, the real-world events may occur at a particular time in the past, present, or future, and at a particular real-world location. The real-world events may be represented by entities in the social-networking system 160, which may be referred to herein as "events" in the social-networking system 160. Each social-networking system event may represent a real-world event, and may have attributes such as a name, location, start time (which may include a date and a time of day on the date), a list of users who have registered to attend the event (e.g., RSVP'd for the event), and an event type, e.g., Sports, Music, Party, or the like, and social-network-related attributes, such as a number of views by users, likes by users, shares by users with other users, and so on. The input signals 154 may be based on such attributes of the events and users.

In particular embodiments, the input signals 154 may include user-related signals 156, location-related signals 157, and event signals 158. The user signals 156 may be user-related signals, which may identify user-related information, such as demographic information and the like. The location signals 157 may identify geographic locations, such as the user's location and/or the event's location. The event signals 158 may identify event-related information, such as the event's name, genre, attendees, start time, and other event-related information. The event signals 158 may also include user-event engagement signals that identify a degree to which a user engages with an event, and friend-event engagement signals that identify a degree to which a friend of the user engages with an event. Although the signals 154 are described herein as including user signals 156, location signals 157, and event signals 158, the signals 154 are not limited to being in one of these three categories.

In particular embodiments, the machine-learning model 184 may be generated by a learning algorithm 182. The learning algorithm 182 may train the model 184 based on training data 180. The training data may include a set of training items, which may be generated by a human trainer based on example events and users presented to the human trainer when the training data 180 is being generated. Each training item may include an example event identified by an event ID 144, an example user identified by a user ID 142, input signals 154 based on the example event and user, and an indication 182 of whether the example user attended the example event. The indication 182 may be generated by a human trainer, who may decide whether the example user attended the example event. The human trainer may be, but is not necessarily, the example user. The input signals 154 associated with each training item may include user signals 156 and event signals 158. The user signals 156 and event signals 158 may be attributes of the user and/or event, or may be derived from attributes of the user and/or event.

In particular embodiments, the input signals 154 may include location signals 157. A location signal 157 may identify or be associated with a location. A location signal that identifies the location of an event may be referred to as an event location signal 157. A location signal that identifies the location of a user may be referred to as a user location signal 157. The location of a user or event may be determined based on a GPS position, a check-in that specifies a location, or the like. The location identified by a location signal 157 may be a raw location, e.g., latitude and longitude. Alternatively, the location identified by a location signal 157 may be a processed location, e.g., an actual place such as a venue, a store, or the like, identified by the raw location. The actual place may be a venue, e.g., Starbucks, a store, or other entity. The processed location may be identified using place visit detection inferences, which may be obtained by running the raw location signals 157 plus other signals that may be obtained from the client system 130, such as ambient WI-FI scans, BLUETOOTH communications, activity recognition, and so on, through a place visit detection system. The place visit detection system may output a probability that the user is at the event venue based on the signals. In particular embodiments, for an event location signal 157, the processed location may be associated with a confidence value, e.g., a probability that the actual place has been correctly identified based on the location. For a user location signal 157, the processed location may be associated with a confidence value, which may be a probability that the user is located at the processed location (e.g., at the actual place at which the event occurs). The processed location may be a list of actual places and associated confidence values, as follows:

List=(place A: probability 0.3, place B: probability 0.1) Thus there may be multiple values with associated levels of confidence for a particular location signal 157. The signals 154 may also include a user-to-event distance signal indicating how far the user lives from the event location or is otherwise located from the event. If the user is located far from the event, then the user may be less likely to attend the event. The user-to-event distance signal is an example of a signal based on both a user location and an event location, may be categorized as one or more of a user signal 156, a location signal 157, or an event signal 158. Although this disclosure describes location signals 157 of particular types, e.g., user signals 156, location signals 157, and event signals 168, this disclosure contemplates signals of any suitable type, e.g., a single type of event signal that may identify either a user location or an event location, or other types of event signals that may identify locations of other types of entities.

In particular embodiments, the input signals 154 may include time-based signals. The time-based signals may include an event start time, e.g., a time and date associated with an event. The time-based signals may also include a time at which the user arrived or is expected to arrive at the event's location. A determination of whether a user attended an event may be based on the event start time and the user's arrival time at the event's location. For example, if a first event begins at 9:00 PM, and the user arrives at the first event's location at 9:05 PM, then the user likely attended the first event. Further, in that example, the user is unlikely to have attended a second event that started next door to the first event at 5:00 PM. Other time-related signals include an event end time, an event duration, and the user's length of stay at a location such as an event location. For example, if an event is of a type that ordinarily has a duration of three hours, and the user stays at the event's location for approximately three hours during the event's duration (e.g., between the event's start and end times on the date of the event), then the user likely attended the event. As another example, if the event is of a type that usually lasts five minutes, and the user stays at the event's location for three hours, then the user may less likely or unlikely to have attended the event. The time-based signals may disambiguate whether the user attended the event, or the user was merely in a place where the event was held. For example, if a user is at a restaurant, and there is a party in a room above the restaurant, the user's location alone does not unambiguously indicate whether the user attended the party, but the time during which the user is at the location and the time during which the party occurs may be compared to resolve the location ambiguity.

In particular embodiments, the input signals 154 may include user-event-engagement signals related to engagement of the user with the event. The user-event-engagement signals may include a signal indicating whether the user RSVP'd for (e.g., indicated that they would attend) an event. For example, if the user RSVP's to indicate that they will attend an event, then the user is more likely to be attending the event than being at a restaurant next door to the event. The user-event-engagement signals may include a signal indicating whether the user interacted with the event, e.g., by viewing the event in a user interface, such as a newsfeed in a social network user interface, or by clicking on the event and looking at the details of the event, then pausing long enough so that an inference may be made that the user had an impression of (e.g., viewed) the event. A user who interacted with the event may have been thinking about the event. If such a user is at a location in the vicinity of the event, then the user is more likely to be at the event rather than next door to the event.

In particular embodiments, the signals 154 may include a friends-engagement signal. For example, if a user has five friends who have indicated they will attend an event, the user is more likely to attend the event (even if the user has not had any interaction with the event, for example). Another friends-engagement signal is the number of a user's friends who have viewed the event. The number of a user's friends who have viewed the event may be proportional to how likely the user is to attend the event.

In particular embodiments, the event signals 158 may include event-popularity signals, such as a fan count or number of likes of the event. Another example of an event-related signal is an indication of whether the event is an "official" event organized by the venue at which the event occurs. For example, an event at the HOUSE OF BLUES may be associated with a signal indicating that the event is organized by the HOUSE OF BLUES, and this signal may indicate an increased likelihood that the user has attended or will attend the event.

The event signals 158 may include an event viewer count signal based on the total number of users who viewed the event. If the number of viewers is large, the event is probably popular, and is more likely to be attended by a particular user. In contrast, if none or very few of the social-networking system's users have viewed an event's page, a particular user is less likely to attend the event. The event signals 158 may also include an event type signal. Events of popular types are more likely to be attended than events of less-popular types. For example, a sporting event is likely to have more attendees than a cooking class.

In particular embodiments, the input signals 154 may be combined in various ways, e.g., heuristically and/or using machine learning. A machine-learning model 184 may be used to combine the signals and make a decision about whether the user attended the event. For example, for an event having a start time in the future, if a user's location is close to or at a place at which an event occurred, e.g., the processed location of the user and/or the processed location of the user indicates with a high confidence that the user is at the same location as the place, the current time is five minutes prior to the start time of the event, the user RSVP'd that they are interested in attending the event, and one friend of the user is at the event, then the user is likely to attend the event. As another example, if an event has a start time in the past, and historical processed location information indicates that the user is at the same location as the event at a time five minutes prior to the event start time, the user RSVP'd that they were interested in attending the event, and one friend of the user was at the event, then the user likely attended the event. Some of the signals are positive, thereby indicating an increased likelihood that the user attended or will attend the event, and some are negative indicating a decreased likelihood that the user attended or will attend the event. Based on its training, the machine learning algorithm weights those signals to decide whether the user was at the event (if the event occurred in the past), is at the event (if the event is occurring at the present time), or will be at the event (if the event occurs in the future).

In particular embodiments, the output of the machine learning model 184 may be an event attendance result 186 indicating whether or not a user attended (or is attending, or will attend) a particular event, and a level of confidence in the event attendance result 186. The machine learning model 184 may be used after the event has occurred to infer whether the user was at the event. One or more of the signals may be based on actions or information from a time prior to the event's occurrence. For example, the user may have RSVP'd one week prior to the event's start time. Other signals may be from after the event's occurrence, e.g., the location and the time of the user after the event, or whether the user showed up in the vicinity of the event at or near the time of the event.

The machine learning model 184 may be trained by learning algorithm 182 using training data 180 that includes user, event pairs from a historical data set, such as the past four or six weeks. Each examples may represented as a tuple, as follows:
 (event, user, input signals, attended),
where event may be identified by an event ID 144, user may be identified by a user ID 142, input signals correspond to the input signals 154, and attended may be a true or false value corresponding to the User Attended Event value 182 and indicating whether the user attended the event.

In particular embodiments, the training data 180 may be gathered by asking users, e.g., using crowdsourcing. To build up a training data set, crowdsourcing may be used to ask random users questions, e.g., but using a survey of users in a random popup displayed in a social-network user interface. The questions may be, e.g., "Did you attend the Oktoberfest event yesterday"? Users may answer Yes or No (or may dismiss the popup without answering). Over time, tens of thousands of responses may be collected and stored as the training data 180.

In particular embodiments, applications of the determination of whether a user attended an event include generating event attendance analytic data for event creators. Such analytic data may provide insights to event creators. For example, the event system may determine how many people attended events in a specified geographic region (e.g., worldwide or in a specified country) during a specified time (e.g., a specified day or month). Attendance information may be used for tracking the performance of the events system itself. As an example, the attendance information may be used to evaluate whether somebody who clicked on an event actually attended the event, and to determine whether the events system is causing more people to go to events.

In particular embodiments, reports with analytical data may include attendance at an event by user state. User state may include whether the user is connected, whether the user liked the event page, or demographics, e.g., the country in which the user is located. Thus it is possible to evaluate how successful the event product is in a particular region, such as Germany.

Reports may also be generated showing attendance at events by event type, privacy type, or other event attribute. As another example, events may be grouped by event type, e.g., Sports, Music, Movies. An event report may be generated comparing attendance at Music evens to attendance at Sports events, thereby enabling an analyst to determine which type of event the event system is more successful at attracting people to. Event types may include privacy types, so that events may be designated as being private events, public events, or page events. Private events may be set up and managed by users, who may invite their friends by, e.g., sending invitations to and sharing the online events with the invited friends. Public events may allow anyone to be invited and attend. Page events may be events that already have a page, e.g., HOUSE OF BLUES has concert pages. In particular embodiments, the event system may be used to determine total event attendance for a particular past event, e.g., after the event has ended. The total event attendance, e.g., number of attendees, for one or more particular past events can be reported to the event organizer.

In particular embodiments, the total attendance, e.g., number of attendees, may be predicted prior to the event. That is, before the event occurs, the event attendance result 186 may be generated for multiple users, such as all users registered for the event or users meeting a particular criteria, e.g., users located within a threshold distance of the event. The generated event attendance results 116 may then be used to predict how many people will attend the event.

In particular embodiments, social network information about the user may be used for one or more of the signals 154. Subject to appropriate privacy controls, the social network information may be retrieved from a social graph of the social-networking system 160, and may include gender demographics of the users who attended to the event. The gender demographics may include attendees' age, gender, home and work locations, life stage (in college or retired), school, and so on. That information may be used as signals to improve recommendations, and may be reported to event organizers.

Figure 2:
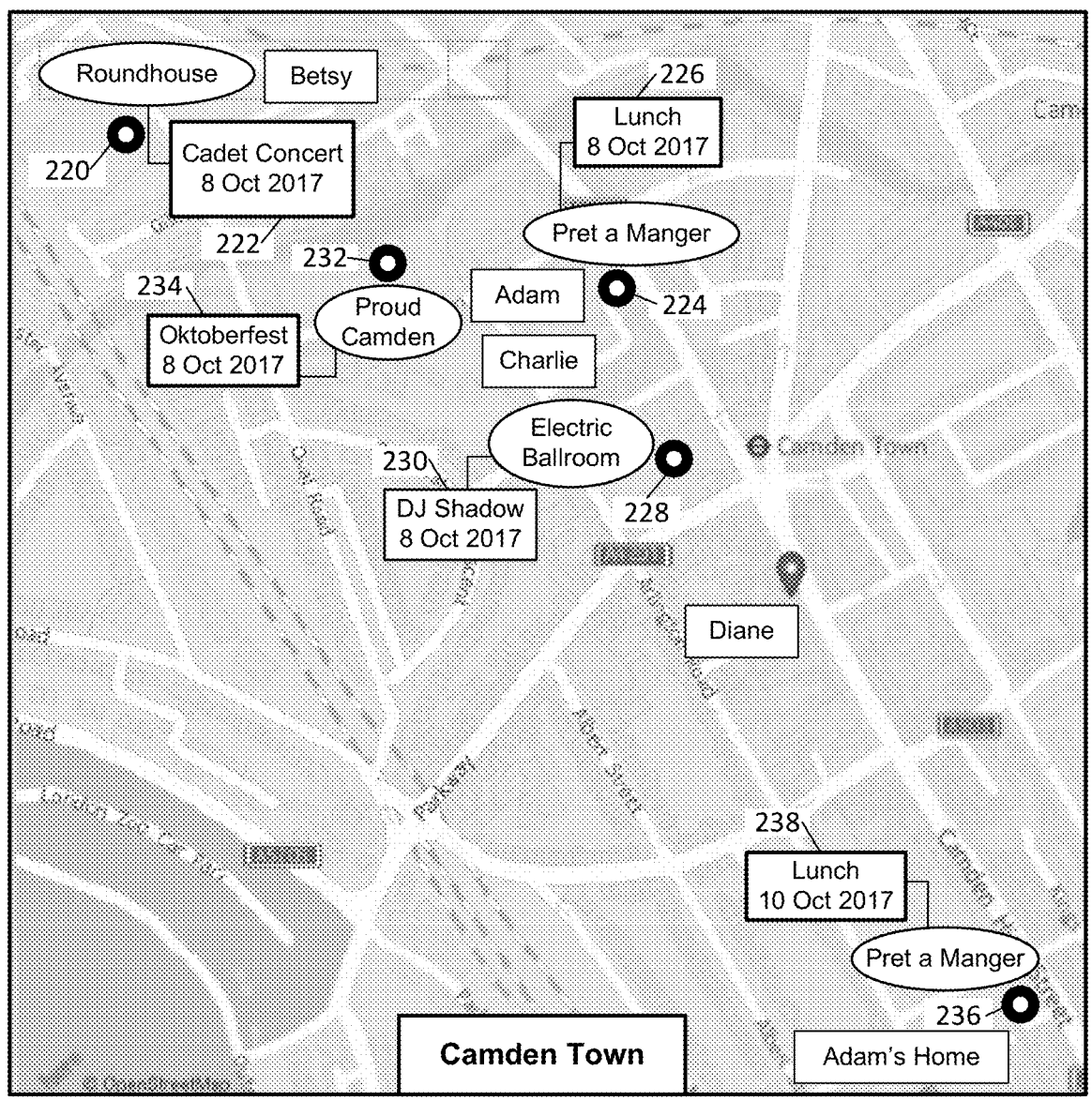
FIG. 2 illustrates example events and their locations on a map.

FIG. 2 illustrates example events and their locations on a map 200. The example events are located in the Camden Town neighborhood of London, and have the following data attributes, which may be used as input signals 154 for the machine learning model 184: a Cadet Concert event 222, which is a Music event, is located at a venue Roundhouse 220, and has a start date of 8 Oct. 2017; a Lunch (8 October) event 226, which is a Food event, is located at a restaurant Pret a Manger 224, and has a start date of 8 Oct. 2017; a DJ Shadow event, which is a Music Event, is located at a venue Electric Ballroom 228, and has a start date of 8 Oct. 2017; an Oktoberfest event 234, which is a Festival event, is located at a venue Proud Camden 232, and has a start date of 8 Oct. 2017; and a Lunch (10 October) event 238, which is a Food event, is located at a restaurant Pret a Manger 236, and has a start date of 10 Oct. 2017. The current locations of the users Adam, Betsy, Charlie, and Diane are shown on the map, as is the location of Adam's home.

Figures 3, 4:
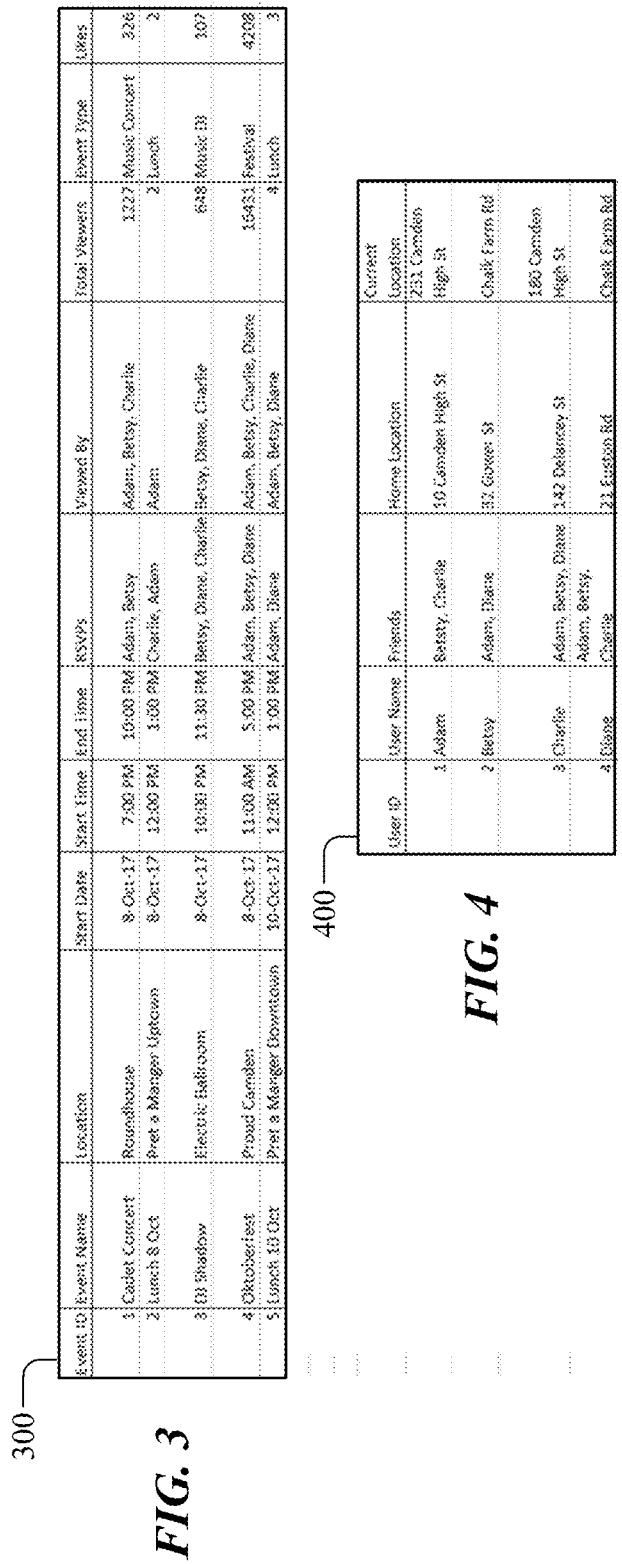
FIG. 3 illustrates example events and their associated signals.
FIG. 4 illustrates example users and their associated signals.

FIG. 3 illustrates example events 300 and their associated signals 154. The example events 300 are the same events shown on the map 200 of FIG. 2. The table of FIG. 3 shows the signals 154 from FIG. 2, such as event name, location, and start date, and also shows additional signals, which include a start time, end time, RSVPs, which is a list of users who accepted invitations to the event, viewed by, which is a list of users who viewed the event in a user interface of the social-networking system 160 (subject to privacy controls), total viewers, which is a count of users who viewed the event; event type; and likes, which is a count of users who indicated they like the event. The signals shown in the table 300, may be used as input signals 154 for the machine learning model 184. The signals shown in FIG. 3, including additional signals not shown in FIG. 2, are as follows: the Cadet Concert event has an event ID of 1, a location Roundhouse, a start time of 7:00 PM, an end time of 10:00 PM, an RSVPs list that includes users Adam and Betsy, a viewed by list that includes users Adam, Betsy, and Charlie, a total viewers count 1227, an event type Music Concert, and a like count 326.

The Lunch (8 October) event has an event ID of 2, a location Pret a Manger Uptown, a start time of 12:00 PM, an end time of 1:00 PM, an RSVPs list that includes users Charlie and Adam, a viewed by list that includes user Adam, a total viewers count 2, an event type Food/Lunch, and a like count 2. The DJ Shadow event has an event ID of 3, a location Electric Ballroom, a start time of 10:00 PM, an end time of 11:30 PM, an RSVPs list that includes users Betsy, Diane, and Charlie, a viewed by list that includes users Betsy, Diane, and Charlie, a total viewers count 648, an event type Music/DJ and a like count 107.

The Oktoberfest event has an event ID of 4, a location Proud Camden, a start time of 11:00 AM, an end time of 5:00 PM, an RSVPs list that includes users Adam, Betsy, and Diane, a viewed by list that includes users Adam, Betsy, Charlie, and Diane, a total viewers count 648, an event type Festival, and a like count 4208. The Lunch (10 October) event has an event ID of 5, a location Pret a Manger Downtown, a start time of 12:00 PM an end time of 1:00 PM an RSVPs list that includes users Adam and Diane, a viewed by list that includes users Adam, Betsy, and Diane, a total viewers count 4, an event type Food/Lunch, and a like count 3.

FIG. 4 illustrates example users 400 and their associated user signals 156. The users 400 include four users: Adam, Betsy, Charlie, and Diane. Adam has a user ID of 1, friends Betsy and Charlie, a home location at 10 Camden High St, and a current location at 233 Camden High Street, which is near the Electric Ballroom venue. Betsy has a user ID of 2, friends Adam and Diane, a home location at 32 Gower St, and a current location at Chalk Farm Road, which is near the Roundhouse venue. Charlie has a user ID of 3, friends Adam, Betsy, and Diane, a home location at 142 Delancey St, and a current location at 180 Camden High St. Diane has a user ID of 3, friends Adam, Betsy, and Charlie, a home location at 21 Euston Rd, and a current location at Chalk Farm Road, which is near the Roundhouse venue.

As an example, the signals shown in FIGS. 3 and 4 may be mapped to a set of signals having normalized values. The example normalized signals include a Distance signal, which is based on the distance between the user's current location and the event's location, a time signal, which is based on the current time and date, an RSVP signal, which is based on whether the user RSVP'd for the event, a Friends RSVP signal, which is based how many of the user's friends RSVP's for the event, a Viewed signal, which is based on whether the user viewed the event's page in a user interface, a Total Views signal, which is based on the total number of views of the event's page by users of the social-networking system, a Type signal, which is based on the type of the event, e.g., Sports, Music, or the like, and a Likes, signal, which is based on the number of times that users have indicated they like the event. Each of these signals may have one of four values that affect the event attendance result 186:0 to indicate no effect on the event attendance result 186, "+" to indicate a small positive increase (e.g., +1 point), "++" to indicate a larger positive increase (e.g., +2 points), and "−' to indicate a decrease (e.g., −1 point). The event attendance result 186 for a particular user and event may be approximated by the sum of these signals, which may be normalized by dividing by the maximum total value, which is 16 points (+2 for 8 signals). The actual event attendance results 186 produced by the machine-learning model 184 may differ from the example signal values shown herein, and the example signal values shown herein are for explanatory purposes.

In particular embodiments, the signals shown in FIGS. 3 and 4, when used as input signals 154, may affect the event attendance results 186 generated in response to queries as to whether a specified user has attended, is attending, or will attend a specified event by the machine learning model 184 as follows. The values of the signals may depend on the current date and/or time as of the time the query is submitted to the machine learning model 184, since some of the signals are time-dependent and may change substantially over a relatively short period of time, such as several minutes for a user location, and several hours for the current time. For example, the current time, current date, and the user's current location may vary with time.

The query may be submitted at a time prior to, during, or after the time during which an event occurs. The time during which an event occurs may start at the event's start time and end at the event's end time. If the query is submitted prior to the time during which the event occurs, then the query may be interpreted as being for a determination of whether the user will attend the event when it occurs in the future, which may be understood as a prediction. The values of frequently-changing time-based signals, e.g., signals that change substantially over relatively short periods of time, e.g., more frequently than a threshold maximum frequency, such as every 1, 5, or 10 minutes, such as the current time and the user's location, may be excluded from the input to the machine-learning model for events that occur in the future, e.g., have a start time more than a threshold time in the future, such as 6 hours, 12 hours, or 24 hours, since the future values of those signals are not ordinarily known, and may change substantially as time passes. The future values of those signals may be similar to their current values for a period of time, such as 6, 12, or 24 hours. For example, a user may remain in the same neighborhood for several hours. For queries that refer to events in the near future, e.g., events having start times within the next 6, 12, or 24 hours (where the particular value may be selected as a configuration parameter), the future value of the time and date signals may be set to a time during the event, such as the event start time. For events that occur in the more distant future, e.g., greater than 6, 12, or 24 hours from the current time, setting a current time signal to the event start time is less likely to generate accurate predictions, so the time and date signals may be excluded from the input to the machine-learning model in such cases. Input signals that change less frequently, e.g., less frequently than a threshold minimum frequency, such as every 6, 12, or 24 hours, may be used by the machine-learning model to generate predictions, since those signals are more likely to remain unchanged between the current time and the event time than frequently-changing signals.

FIGS. 5A and 5B illustrate example signals. The values of the example signals for queries to determine whether each of the example users Adam, Betsy, Charlie, and Diane attended each of the example events Cadet Concert, Lunch (8 October), and DJ Shadow are shown in the table 500 of FIG. 5A. The signal values for each combination of an event and a user are shown in the table at the intersection of the row corresponding to the event and the column corresponding to user.

In particular embodiments, FIGS. 5A and 5B show the signal values for example queries submitted at 12:05 PM on 7 Oct. 2017, which is during the Lunch (October 7) event but prior to the other four events. A query submitted during the time that an event is taking place (e.g., the time during which the event occurs), or close to the time that the event is taking place (e.g., less than a threshold time, such as 8, 12, or 24 hours) may be evaluated based on the current values of the signals.

In particular embodiments, a query submitted after the event occurs may be evaluated based on historical data that contains the values the signals had at the time the event occurred. If historical data is not available for the time at which the event occurred, then time-dependent signal that are likely to be out of date, particularly those that vary significantly over relatively short periods of time, such as over minutes or hours, such as location-based and time-based signals, may be excluded from the input to the machine-learning model. Signals that vary less frequently, such as social-network connections and user preferences, may be included in the input to the machine-learning model. Certain signals may be unavailable after an event has occurred if historical data is not stored. For example, information related to an event, such as the event time and the list of users who RSVP'd for the event, may be unavailable if the event has been deleted from the system, and thus are not included in the input to the machine-learning model.

The example queries shown in the table 500 of FIG. 5A, which are submitted at 12:05 PM on 7 Oct. 2017 for the purposes of these examples, may be evaluated using the corresponding signal values shown in the table 500. For a query to determine whether the user Adam will attend the Cadet Concert, e.g., the query (Adam, Cadet Concert), the signal values are Distance: +, Time: +, RSVP: ++, Friends RSVP: +, Viewed: ++, Total views: +, Type: +, Likes: +. The Distance signal has the value+ because Adam's current location is relatively close to the location of the event (Roundhouse 220). The Time signal has the value+ because the Cadet Concert event starts relatively soon (7:00 PM). The RSVP signal has the value ++ because Adam has RSVP'd to the event. The Friends RSVP signal has the value + because at least one of Adam's friends (e.g., Betsy) has RSVP'd to the event. The Viewed signal is ++ because the event has been viewed by Adam. The Total views signal is + because the event has a substantial number of total views (1227). The Type signal is + because Adam is interested in the type of event (Music Concert). The Likes signal is + because the event has a substantial number of likes (326). The normalized total of these signal values is 10 divided by 16 (10/16). Since the maximum total score is 16 in the examples, the total value 10 may be directly compared to the total values of the other queries (without normalization) to determine which of two queries is more likely to result in a positive event attendance result. Note that these example signals include signals derived from other signals, as the Likes signal, which may have four values, is derived from the Likes signal shown in FIG. 3, which is a count that may change frequently. That is, the derived Likes signal maps the raw Likes signal into a smaller number of values according to criteria. For example, the derived Likes signal may have the value 0 if the raw Likes signal is between 0 and 10, the value + if the raw Likes signal is between 10 and 500, and the value ++ if the raw Likes signal is greater than 500. Thus, a quickly-changing signal, such as the raw Likes signal, may be converted to a more slowly-changing signal, which may be more appropriate for use in predicting whether a user will attend an event that starts in the future. Other signals that represent counts or other rapidly changing values may similarly be mapped to a smaller range of values, such as the Total Viewers signal. For example, the location signal 157 may be mapped to a less specific value, e.g., places at particular street addresses may be mapped to neighborhoods or cities in which the places are located.

As an example, for a query (Betsy, Cadet Concert), to determine whether Betsy will attend the Cadet Concert according to the signals, the signal values are similar to those described above for the (Cadet Concert, Adam) query, except the Betsy is closer to the location of the event and has a Distance signal value of ++, and Betsy has a Type signal value of 0 (Betsy is not ordinarily interested in Music Concert events). The total signal value for the (Cadet Concert, Diane) query is 10.

As an example, for a query (Charlie, Cadet Concert), to determine whether Charlie will attend the Cadet Concert, the signal values are similar to those of the (Cadet Concert, Adam) query, except that Charlie has not RSVP'd to the event and so has an RSVP signal value of 0, and Charlie has a Type signal value of 0 (Charlie is not ordinarily interested in Music Concert events). The total signal value for the (Cadet Concert, Diane) query is 7.

As an example, for a query (Diane, Cadet Concert), to determine whether Diane will attend the Cadet Concert, the signal values are lower than those for the queries described above. Diane is not at a location close to the Cadet Concert venue, so she has a Distance signal value of 0. Diane has not RSVP'd to the event, so she has an RSVP value of 0. None of Diane's friends have RSVP'd to the event either, so Diane has a Friends RSVP value of 0. Diane has not viewed the event, so she has a Viewed signal value of 0. Diane is interested in events of the type Music Concert, however, and has a Type signal value of +. The total signal value for the (Cadet Concert, Diane) query is 4. Thus, since Adam and Betsy have the highest score value (10) for the Cadet Concert queries, Adam and Betsy are the most likely to attend the Cadet Concert.

As another example, for the event Lunch (October 8), the total signal values of Adam, Betsy, Charlie and Diane are 10, 5, 7, and 5, respectively. Thus, Adam is the most likely to attend the Lunch (8 October) event. Adam's signal value is highest than the others because Adam is located close to the event venue (Pret a Manger Uptown), has RSVP'd for the event, and has viewed the event. The other users do not have as many high signal values as Adam for this event.

As another example, for the event DJ Shadow, Adam is less likely to attend, because Adam is not particularly close to the event venue, has not RSVP'd for the event, and has not viewed the event. The other users, Betsy, Charlie, and Diane, each have a total signal value of 9, because each has RSVP'd to ad viewed the event.

As another example, for the Oktoberfest event, Diane has the highest total signal value, 13, because Diane is located close to the event venue (Distance: ++), the event is in progress at the current time (Time: ++), Diane has RSVP'd, and viewed the event. Note that the Time signal is user-independent, as are the Total views and Likes signals. The Likes symbol has the value++ because the Oktoberfest has received 4208 likes.

As an example of an event that occurs in the future, the Lunch (10 October) event starts at 12:00 PM on 10 October, which is approximately 2 days from the current time on 8 October when the example query is executed. For the query (Lunch (10 October), Adam), the Distance value is + because Adam's home (10 Camden High St) is located near the event location (Pret a Manger Downtown, at 18 Camden High St). This "home distance" variation of the Distance signal may be used when the Distance signal based on the current location is unknown because the event occurs in the future. The Distance signal has the value 0 for the other three users because the locations of those users in the future is unknown, and the locations of their homes are not near the event location. The Time signal is 0 for all four users because the event occurs a substantial time (e.g., more than 24 hours) in the future. If the event were to have a start time in the more distant future, e.g., more than 1 month from the current time, then the value of the Time signal may be set to "−" (e.g., −1). The remaining signals vary less frequently over time, and are unlikely to vary substantially between the current time (8 October) and the event time (10 October). Adam has the highest total signal value for the Lunch (10 October) event because his home is located near the event venue, and he has RSVP'd to and viewed the event. Thus, a query to determine whether Adam will attend the Lunch (10 October) event is more likely to return a positive result than queries to determine whether the other users will attend that event.

Figure 6:
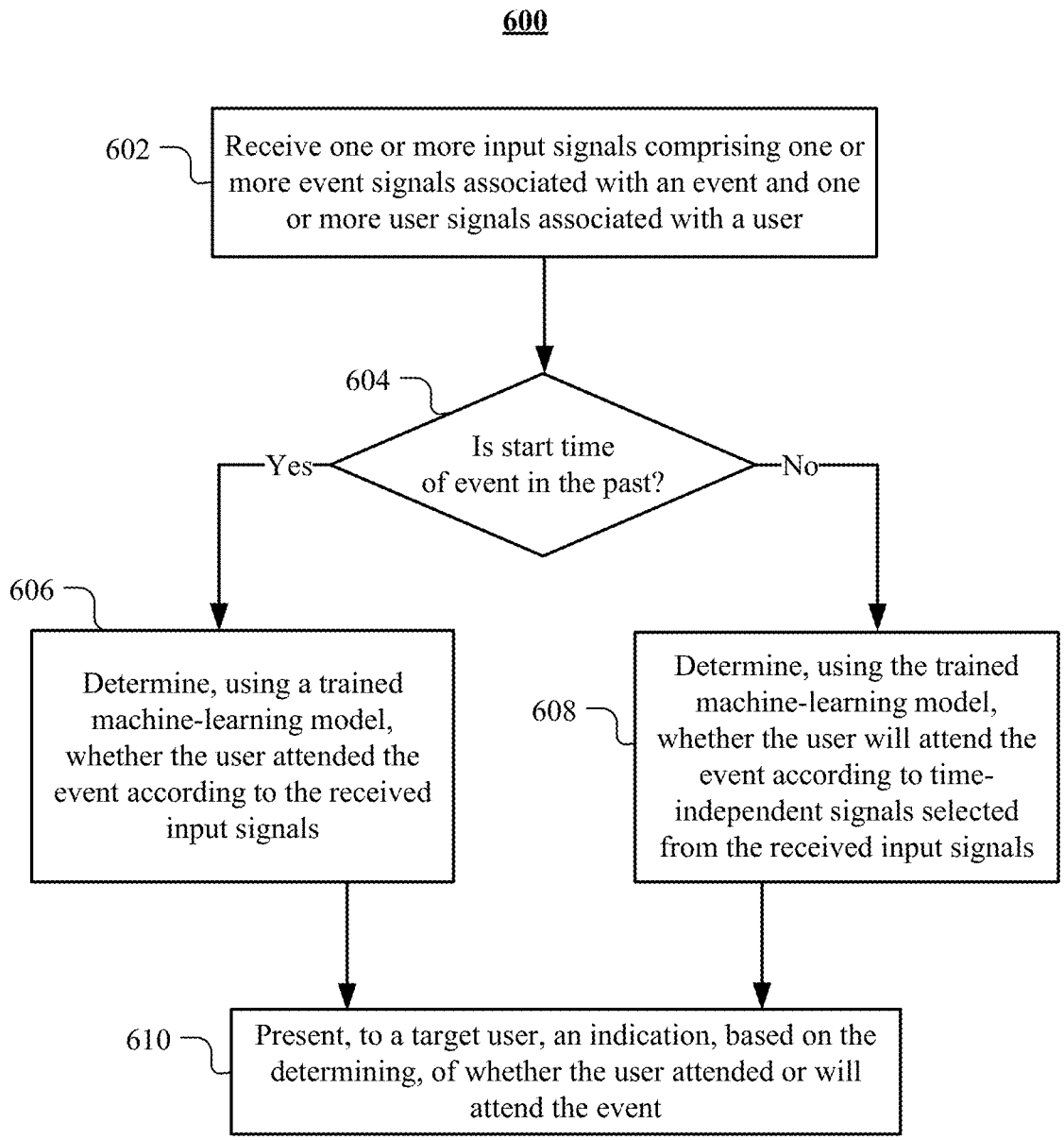
FIG. 6 illustrates an example method for determining whether particular users have attended or will attend particular events according to signals associated with the users and events.

FIG. 6 illustrates an example method 600 for determining whether particular users have attended or will attend particular events according to signals associated with the users and events. The method 600 may begin at step 602, where the social-networking system 160 may receive one or more input signals 154 comprising one or more event signals 158 associated with an event, one or more user signals 156 associated with a user, and/or one or more location signals 157 associated with one or more locations. At step 604, the social-networking system 160 may determine whether the start time of the event is in the past, e.g., is prior to the current time. At step 606, if the start time is in the past, the social-networking system 160 may determine, using a trained machine-learning model, whether the user attended the event according to one or more frequently-changing and one or more infrequently-changing signals from the received input signals. At step 608, if the start time is at the present time or in the future, the social-networking system may determine, using the trained machine-learning model, whether the user will attend the event according to one or more infrequently-changing signals from the received input signals. Step 608 may also determine an associated confidence value for the result. At step 610, the social-networking system 160 may present, to a target user, an indication, based on the determining, of whether the user attended or will attend the event.

In particular embodiments, the input signals may include one or more time-based signals, and each time-based signal may include an event time or a user arrival time. The user arrival time may indicates a time at which the user arrived at a location. The input signals may comprise one or more location-based signals, and each location-based signal may include an event location, a user location, or a both. The input signals comprise one or more event engagement signals indicating how the user engaged with the event. The event engagement signals may include a signal indicating whether the user confirmed that he or she would attend the event or a signal indicating whether the user viewed the event in a user interface.

In particular embodiments, the input signals may include one or more friend engagement signals indicating how one or more friends of the user engaged with the event. The friend engagement signals may include a signal indicating how many of the user's friends indicated they would attend the event or a signal indicating how many of the user's friends have viewed the event in a user interface.

In particular embodiments, the input signals may include a signal indicating a popularity level of the event, a signal indicating a fan count of an event page associated with the event, a signal identifying the venue at which the event occurred, a signal indicating a total number of people who viewed the event, or a signal indicating a type of the event.

In particular embodiments, the input signals may include one or more frequently-changing signals and one or more infrequently changing signals that change less frequently than the frequently-changing signals. Changes in the frequently-changing signals may occur more frequently than a threshold maximum frequency, e.g., every 1, 5, or 10 minutes. Changes in the infrequently-changing signals may occur less frequently than a threshold minimum frequency, e.g., every 6, 12, or 24 hours. Determining if the user attended the event may include determining, using a trained machine-learning model, whether the user attended the event according to the frequently-changing and infrequently-changing input signals. The method may further include, if the start time of the event is the future, determining, using the trained machine-learning model, whether the user will attend the event according to the infrequently-changing signals.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for improving search result rankings including the particular steps of the method of FIG. 6, this disclosure contemplates any suitable method for improving search result rankings including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
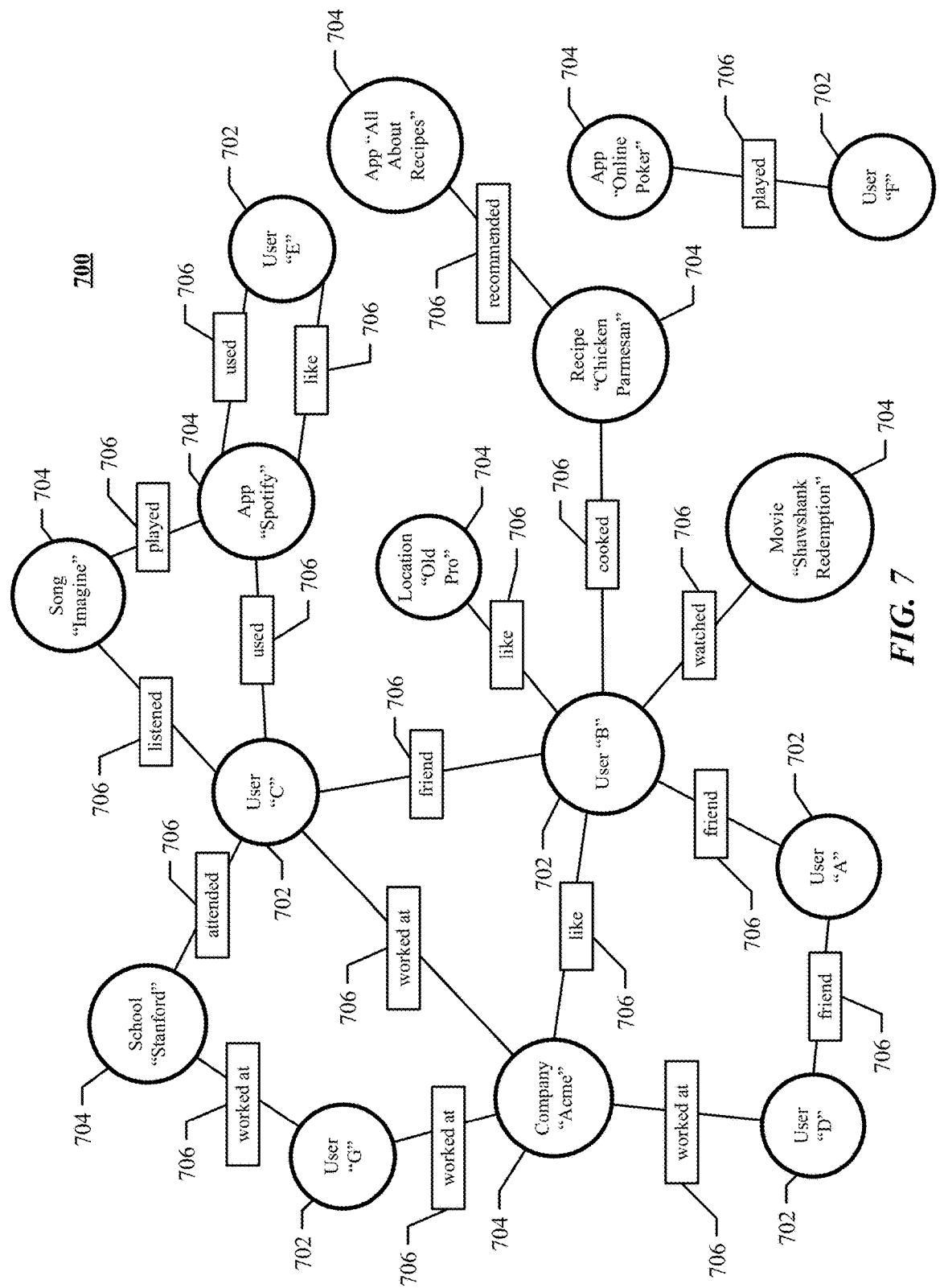
FIG. 7 illustrates an example social graph.

FIG. 7 illustrates example social graph 700. In particular embodiments, social-networking system 160 may store one or more social graphs 700 in one or more data stores. In particular embodiments, social graph 700 may include multiple nodes—which may include multiple user nodes 702 or multiple concept nodes 704—and multiple edges 706 connecting the nodes. Example social graph 700 illustrated in FIG. 7 is shown, for didactic purposes, in a two-dimensional visual map representation. In particular embodiments, a social-networking system 160, client system 130, or third-party system 170 may access social graph 700 and related social-graph information for suitable applications. The nodes and edges of social graph 700 may be stored as data objects, for example, in a data store (such as a social-graph database). Such a data store may include one or more searchable or queryable indexes of nodes or edges of social graph 700.

In particular embodiments, a user node 702 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 702 corresponding to the user, and store the user node 702 in one or more data stores. Users and user nodes 702 described herein may, where appropriate, refer to registered users and user nodes 702 associated with registered users. In addition or as an alternative, users and user nodes 702 described herein may, where appropriate, refer to users that have not registered with social-networking system 160. In particular embodiments, a user node 702 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 702 may be associated with one or more data objects corresponding to information associated with a user. In particular embodiments, a user node 702 may correspond to one or more webpages.

In particular embodiments, a concept node 704 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 704 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 704 may be associated with one or more data objects corresponding to information associated with concept node 704. In particular embodiments, a concept node 704 may correspond to one or more webpages.

In particular embodiments, a node in social graph 700 may represent or be represented by a webpage (which may be referred to as a "profile page"). Profile pages may be hosted by or accessible to social-networking system 160. Profile pages may also be hosted on third-party websites associated with a third-party system 170. As an example and not by way of limitation, a profile page corresponding to a particular external webpage may be the particular external webpage and the profile page may correspond to a particular concept node 704. Profile pages may be viewable by all or a selected subset of other users. As an example and not by way of limitation, a user node 702 may have a corresponding user-profile page in which the corresponding user may add content, make declarations, or otherwise express himself or herself. As another example and not by way of limitation, a concept node 704 may have a corresponding concept-profile page in which one or more users may add content, make declarations, or express themselves, particularly in relation to the concept corresponding to concept node 704.

In particular embodiments, a concept node 704 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 702 corresponding to the user and a concept node 704 corresponding to the third-party webpage or resource and store edge 706 in one or more data stores.

In particular embodiments, a pair of nodes in social graph 700 may be connected to each other by one or more edges 706. An edge 706 connecting a pair of nodes may represent a relationship between the pair of nodes. In particular embodiments, an edge 706 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 706 connecting the first user's user node 702 to the second user's user node 702 in social graph 700 and store edge 706 as social-graph information in one or more of data stores 164. In the example of FIG. 7, social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 700 by one or more edges 706.

In particular embodiments, an edge 706 between a user node 702 and a concept node 704 may represent a particular action or activity performed by a user associated with user node 702 toward a concept associated with a concept node 704. As an example and not by way of limitation, as illustrated in FIG. 7, a user may "like," "attended," "played," "listened," "cooked," "worked at," or "watched" a concept, each of which may correspond to an edge type or subtype. A concept-profile page corresponding to a concept node 704 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 706 and a "used" edge (as illustrated in FIG. 7) between user nodes 702 corresponding to the user and concept nodes 704 corresponding to the song and application to indicate that the user listened to the song and used the application. Moreover, social-networking system 160 may create a "played" edge 706 (as illustrated in FIG. 7) between concept nodes 704 corresponding to the song and the application to indicate that the particular song was played by the particular application. In this case, "played" edge 706 corresponds to an action performed by an external application (SPOTIFY) on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 7 between user node 702 for user "E" and concept node 704 for "SPOTIFY").

In particular embodiments, social-networking system 160 may create an edge 706 between a user node 702 and a concept node 704 in social graph 700. As an example and not by way of limitation, a user viewing a concept-profile page (such as, for example, by using a web browser or a special-purpose application hosted by the user's client system 130) may indicate that he or she likes the concept represented by the concept node 704 by clicking or selecting a "Like" icon, which may cause the user's client system 130 to send to social-networking system 160 a message indicating the user's liking of the concept associated with the concept-profile page. In response to the message, social-networking system 160 may create an edge 706 between user node 702 associated with the user and concept node 704, as illustrated by "like" edge 706 between the user and concept node 704. In particular embodiments, social-networking system 160 may store an edge 706 in one or more data stores. In particular embodiments, an edge 706 may be automatically formed by social-networking system 160 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. As an example and not by way of limitation, an advertisement may display information about a friend of the user within social-networking system 160 who has taken an action associated with the subject matter of the advertisement.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 704 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 8:
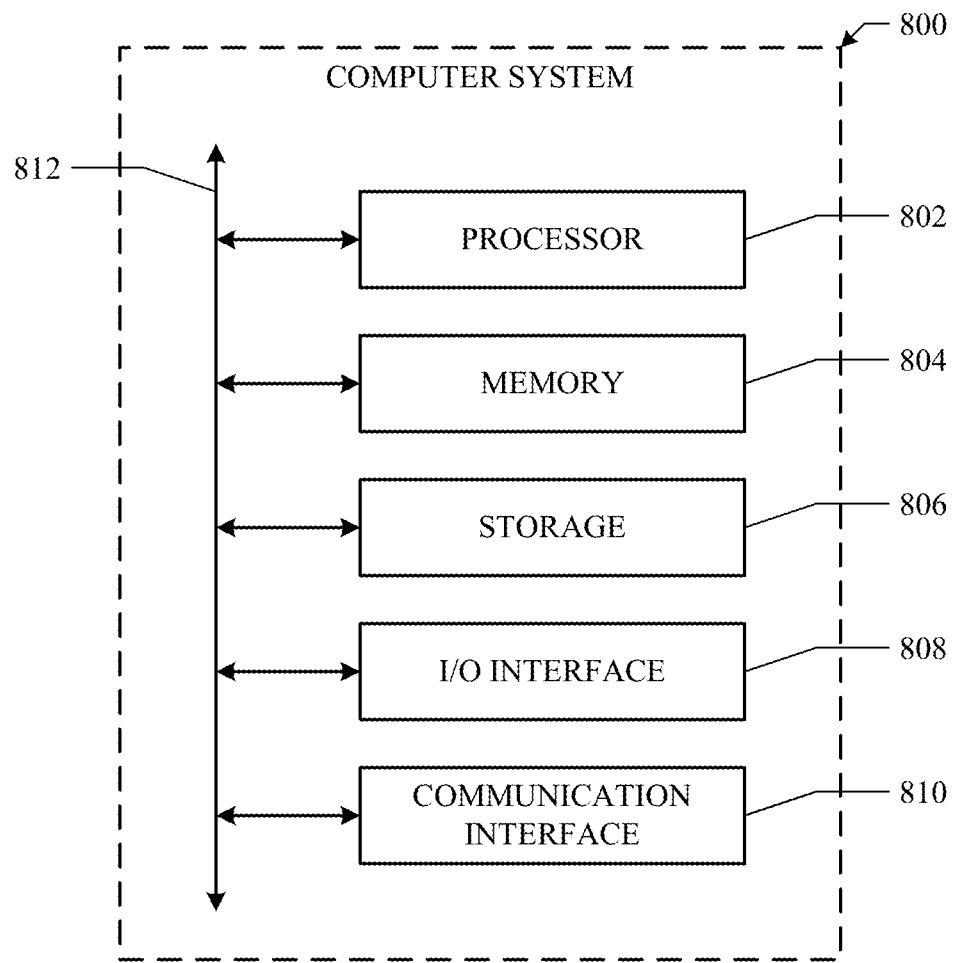
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
   by one or more computer systems, receiving one or more input signals comprising one or more event signals associated with an event and one or more user signals associated with a user,
   wherein the input signals comprise one or more time-based signals, and each time-based signal comprises an event time, a user arrival time, or a combination thereof,
   wherein the input signals further comprise one or more location-based signals, and each location-based signal comprises an event location, a user location, or a combination thereof;
   by the one or more computer systems, determining, using a trained machine-learning model, whether the user attended the event according to the input signals; and
   by the one or more computer systems, presenting, to a target user, an indication, based on the determining, of whether the user attended the event; and
   wherein the input signals further comprise one or more friend engagement signals indicating how one or more friends of the user engaged with the event; and
   wherein the one or more friend engagement signals comprise one or more of:
   a signal indicating how many of the user's friends indicated they would attend the event, and
   a signal indicating how many of the user's friends have viewed the event in a user interface.

2. The method of claim 1, wherein each input signal is based on one or more attributes of a corresponding event, one or more attributes of a corresponding user, or a combination thereof.

3. The method of claim 1, further comprising:
   by the one or more computer systems, training the machine learning model using training data, wherein the training data comprises one or more tuples, each tuple comprising a user identifier, an event identifier, and an indication of whether the user identified by the user identifier attended the event identified by the event identifier.

4. The method of claim 1, wherein each location-based signal is represented as a raw location that includes geographic coordinates or a processed location that includes a place identifier.

5. The method of claim 4, wherein the place identifier is associated with a confidence value indicating a probability that the place identifier is correctly associated with the processed location.

6. The method of claim 1, wherein the event time indicates a time at which an associated event began or ended, or a duration of time for which the user attended the associated event.

7. The method of claim 1, wherein the user arrival time indicates a time at which the user arrived at a location.

8. The method of claim 1, wherein the input signals further comprise one or more event engagement signals indicating how the user engaged with the event.

9. The method of claim 8, wherein the event engagement signals comprise one or more of:
   a signal indicating whether the user confirmed that he or she would attend the event, or
   a signal indicating whether the user viewed the event in a user interface.

10. The method of claim 1, wherein the input signals further comprise one or more of:
    a signal indicating a popularity level of the event;
    a signal indicating a fan count of an event page associated with the event;
    a signal identifying a venue at which the event occurred or will occur;
    a signal indicating a total number of people who viewed the event; or
    a signal indicating a type of the event.

11. The method of claim 1, wherein the determining further generates a confidence value indicating a level of confidence in the determination of whether the user attended the event.

12. The method of claim 1 wherein the input signals further comprise one or more frequently-changing signals and one or more infrequently changing signals that change less frequently than the frequently-changing signals.

13. The method of claim 12, wherein changes in the frequently-changing signals occur more frequently than a threshold maximum frequency, and changes in the infrequently-changing signals occur less frequently than a threshold minimum frequency.

14. The method of claim 12, wherein the determining if the user attended the event comprises determining, using the trained machine-learning model, whether the user attended the event according to the frequently-changing and infrequently-changing input signals.

15. The method of claim 12, further comprising:
    by the one or more computer systems, if the start time of the event is more than a threshold time in the future, determining, using the trained machine-learning model, whether the user will attend the event according to the infrequently-changing signals.

16. The method of claim 15, further comprising:
    by the one or more computer systems, presenting, to the target user, an indication, based on the determining whether the user will attend the event, of whether the user will attend the event.

17. One or more computer-readable non-transitory storage media embodying software that is operable when executed to:
    receive one or more input signals comprising one or more event signals associated with an event and one or more user signals associated with a user,
    wherein the input signals comprise one or more time-based signals, and each time-based signal comprises an event time, a user arrival time, or a combination thereof,
    wherein the input signals further comprise one or more location-based signals, and each location-based signal comprises an event location, a user location, or a combination thereof;
    determine, using a trained machine-learning model, whether the user attended the event according to the input signals;
    present, to a target user, an indication, based on the determining, of whether the user attended the event; and
    wherein the input signals further comprise one or more friend engagement signals indicating how one or more friends of the user engaged with the event; and
    wherein the one or more friend engagement signals comprise one or more of:
    a signal indicating how many of the user's friends indicated they would attend the event, and
    a signal indicating how many of the user's friends have viewed the event in a user interface.

18. A system comprising:
    one or more processors; and
    one or more computer-readable non-transitory storage media coupled to one or more of the processors and comprising instructions operable when executed by one or more of the processors to cause the system to:
    receive one or more input signals comprising one or more event signals associated with an event and one or more user signals associated with a user,
    wherein the input signals comprise one or more time-based signals, and each time-based signal comprises an event time, a user arrival time, or a combination thereof,
    wherein the input signals further comprise one or more location-based signals, and each location-based signal comprises an event location, a user location, or a combination thereof;
    determine, using a trained machine-learning model, whether the user attended the event according to the input signals;
    present, to a target user, an indication, based on the determining, of whether the user attended the event; and
    wherein the input signals further comprise one or more friend engagement signals indicating how one or more friends of the user engaged with the event; and
    wherein the one or more friend engagement signals comprise one or more of:
    a signal indicating how many of the user's friends indicated they would attend the event, and
    a signal indicating how many of the user's friends have viewed the event in a user interface.

* * * * *